US006306932B1

(12) United States Patent
Yamamoto et al.

(10) Patent No.: US 6,306,932 B1
(45) Date of Patent: *Oct. 23, 2001

(54) ANTI-FOGGING COATING MATERIAL, ANTI-FOGGING COATING FILM AND ANTI-FOGGING ARTICLE

(75) Inventors: Tohru Yamamoto; Shigeo Yoshida; Hatsumi Ikari, all of Shiga-ken; Keiji Ikemori, Yokohama; Keiji Ohtaka, Yokohama; Hideo Ukuda, Yokohama, all of (JP)

(73) Assignees: Canon Kabushiki Kaisha, Tokyo (JP); Nakato Laboratory, Inc., Shiga-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,409

(22) Filed: Aug. 26, 1998

(30) Foreign Application Priority Data

Aug. 27, 1997 (JP) ..................................................... 9-230530

(51) Int. Cl.[7] .............................. C08J 3/00; C08K 29/04; C08K 5/07; C08L 29/04; C09K 3/18
(52) U.S. Cl. ................. 523/169; 522/8; 522/33; 524/359; 524/394; 524/401; 524/503
(58) Field of Search ................. 523/169; 522/8, 522/33; 524/359, 394, 401, 503

(56) References Cited

FOREIGN PATENT DOCUMENTS 0 716 051 A2 * 6/1996 (EP).
0871046A1 10/1998 (EP).
8-231944 9/1996 (JP).

OTHER PUBLICATIONS

Patent Abstracts of Japan, vol. 017, No. 406 (C–1090), Jul. 22, 1993.
Patent Abstracts of Japan, vol. 012, No. 501 (C–556), Dec. 27, 1988.
Patent Abstracts of Japan, vol. 011, No. 012 (P–535), Jan. 13, 1987.
Patent Abstracts of Japan, vol. 013, No. 227 (C–600), May 25, 1989.
Patent Abstracts of Japan, vol. 013, No. 223 (M–829), May 24, 1989.
Patent Abstracts of Japan, vol. 016, No. 437 (C–0984), Sep. 11, 1992.
Patent Abstracts of Japan, vol. 1997, No. 01, Jan. 31, 1997.
Patent Abstracts of Japan, vol. 1998, No. 01, Jan. 30, 1998.

* cited by examiner

Primary Examiner—Patrick D. Niland
(74) Attorney, Agent, or Firm—Fitzpatrick, Cella, Harper & Scinto

(57) ABSTRACT

Disclosed herein is an anti-fogging coating material comprising at least one selected from the group consisting of an inorganic alkoxide, a hydrolysate of the inorganic alkoxide and a polycondensate of the hydrolysate of the inorganic alkoxide, a polyacrylic, and polyvinyl alcohol.

14 Claims, No Drawings

US 6,306,932 B1

ANTI-FOGGING COATING MATERIAL, ANTI-FOGGING COATING FILM AND ANTI-FOGGING ARTICLE

BACKGROUND OF THE INVENTION

1. Field of the Invention

The present invention relates to an anti-fogging coating material which is capable of imparting hydrophilicity and the function of absorbing water to the surfaces of substrates, such as optical lenses, spectacles and window glass of vehicles, which require anti-fogging properties and the prevention of dew condensation, and the surfaces of films for bubble-jet printers, and forming a water-insoluble film having a high surface hardness, an anti-fogging coating film formed out of the anti-fogging coating material, and an anti-fogging article on which the anti-fogging coating film has been formed.

2. Related Background Art

The reason why substrates such as glass and plastics fog up is that moisture in the air adheres thereto in the form of fine waterdrops because their surface temperatures are lowered to a dew point or lower, and so light is irregularly reflected on the surfaces of the substrates. Accordingly, it is considered that the occurrence of fogging can be prevented by preventing the formation of waterdrops on the surfaces of the substrates. As such anti-fogging methods, for example, four factors of (A) adjustment of wetting; (B) impartment of water-absorbing properties; (C) impartment of water repellency; and (D) adjustment of humidity by heating have been considered.

With respect to the factor (A), anti-fogging sprays and the like are on the market for the purpose of adjusting wetting, namely, making a contact angle between a substrate and a waterdrop small. However, such a spray uses a surfactant or the like, so that the durability of its effect is not good.

With respect to the factor (B), the water-absorbing properties is an effect brought about by a coating film of a hydrophilic polymer, and the durability of the effect is somewhat good when compared with the anti-fogging spray. However, a substrate to the surface of which the water-absorbing properties have been imparted by such a coating film fogs up when exceeding the water absorption capacity of the coating film, and the surface begins to dissolve.

With respect to the factor (C), the water repellency is imparted by applying a water-repellent compound to a substrate. When the water-repellent compound is applied to, in particular, the inside surface of a vinyl plastic hothouse, fine waterdrops on the surface come into contact each other and fall as bigger waterdrops, whereby anti-fogging properties can be developed. However, fine waterdrops may adhere to the surface in some cases, resulting in the occurrence of fogging.

With respect to the factor (D), the adjustment of humidity by heating can achieve an anti-fogging effect on lenses of copying machines, rear windshields for automobiles and high-grade dressing tables. Since a power source is required, however, its application fields are limited.

Further, the films formed out of an anti-fogging coating composition comprising an organic polymer containing a surfactant have been developed. This anti-fogging coating composition is so designed that the film formed is made hydrophilic by polyether polyol in the presence of the surfactant to absorb moisture, and wetting is adjusted by the surfactant contained when the moisture exceeds the critical point of water absorption of this film, thereby retaining good transparency. Since the surfactant is easily dissolved in water and dissolved out, however, the anti-fogging properties and strength of the film are markedly lowered.

Japanese Patent Application Laid-Open No. 8-231944 discloses that the drawbacks involved in the conventional methods are improved by using polyalkylene oxide and a polyacrylic as organic polymers, and making use of a three-dimensional structure formed by the hydrolysis and polycondensation reaction of an inorganic alkoxide. However, a problem arises after immersion in water for a long period of time and upon use at a low temperature, and so there is a tendency not to sufficiently develop its performance.

SUMMARY OF THE INVENTION

The present invention has been made to solve the above-described drawbacks involved in the prior art, and its object is to provide a coating material for providing a anti-fogging coating film which is hydrophilic and water-insoluble and has high water absorbing power and excellent surface hardness, and in particular, an anti-fogging coating material for enhancing surface precision in the coating and light transmission properties of optical lenses and the like.

Another object of the present invention is to provide an anti-fogging coating film formed out of the coating material described above and an anti-fogging article on which the anti-fogging coating film has been formed.

The above objects can be achieved by the present invention described below.

The present invention provides an anti-fogging coating material comprising at least one selected from the group consisting of an inorganic alkoxide, a hydrolysate of the inorganic alkoxide and a polycondensate of the hydrolysate of the inorganic alkoxide, a polyacrylic, and polyvinyl alcohol.

The present invention provides an anti-fogging coating film formed by using, as a main component, a composition obtained by the polycondensation reaction of a hydrolysate of an inorganic alkoxide in the presence of a polyacrylic and polyvinyl alcohol.

The present invention provides an anti-fogging coating film formed by using, as a main component, a composition obtained by the polycondensation reaction of a hydrolysate of an inorganic alkoxide in the presence of a polyacrylic, polyvinyl alcohol and hydrosilicofluoric acid.

The present invention provides an anti-fogging coating film formed by using, as a main component, a composition obtained by the polycondensation reaction of a hydrolysate of an inorganic alkoxide in the presence of a polyacrylic, polyvinyl alcohol, hydrosilicofluoric acid and a silane coupling agent having an epoxy group.

The present invention yet further provides an anti-fogging coating film formed by using, as a main component, a composition obtained by the polycondensation reaction of a hydrolysate of an inorganic alkoxide in the presence of a polyacrylic, polyvinyl alcohol and a specific benzophenone compound.

The present invention yet still further provides an anti-fogging article obtained by providing any one of the aforementioned anti-fogging coating films on the surface of a substrate.

The anti-fogging coating films obtained by using the anti-fogging coating material according to the present invention combine excellent anti-fogging properties with high insolubility, abrasion resistance and weather resistance which are required of anti-fogging coating films. Such a phenomenon that the anti-fogging properties is developed on the anti-fogging coating films according to the present invention is considered to be as follows. The polyacrylic and polyvinyl alcohol are generally soluble in water or an alcoholic solvent. However, the polyacrylic and polyvinyl alcohol contained in the anti-fogging coating films according to the present invention do not dissolve out even when the films are immersed in water or the alcoholic solvent. The reason is considered to be due to the fact that when a hydrolysate of an inorganic alkoxide undergoes the polycondensation reaction, it also reacts with the coexisting polyacrylic and polyvinyl alcohol to form a complex polymer having an inorganic moiety derived from the inorganic alkoxide and an organic moiety having hydrophilic groups derived from the polyacrylic and polyvinyl alcohol. Further, the hydrophilic groups of the complex polymer effectively orient, whereby moisture or water from the outside can be absorbed greatly and quickly.

The hydrolysis of the inorganic alkoxide and the polycondensation reaction subsequent thereto are called a sol-gel processing reaction such that an inorganic alkoxide is subjected to hydrolysis and polycondensation reaction in its solution to convert the solution into sol in which fine particles of an inorganic oxide or inorganic hydroxide are dissolved, and the reaction is further allowed to proceed to form gel. In the present invention, a film has been formed with the anti-fogging coating material obtained by conducting this reaction in the presence of the polyacrylic and polyvinyl alcohol, thereby obtaining an anti-fogging coating film having excellent anti-fogging properties.

DETAILED DESCRIPTION OF THE PREFERRED EMBODIMENTS

The inorganic alkoxide used in the present invention is at least one of compounds represented by the formulae

$$M(OR)_n(X)_{a-n} \quad (I)$$

wherein M is an element selected from the group consisting of Si, Al, Ti, Zr, Ca, Fe, V, Sn, Li, Be, B and P, R is an alkyl group, X is an alkyl group, an alkyl group having a functional group or halogen, a is a valence of M, and n is an integer of from 1 to a.

Among the compounds represented by the formula (I), the compounds in which n equals a, namely, the compounds in which only alkoxyl groups are bonded to M, are commonly used.

When M is Si, a is 4. Such an alkoxide is represented by $Si(OR^1)_4$, wherein $R^1$ is preferably an alkyl group having 1 to 4 carbon atoms (hereinafter referred to as a lower alkyl group). Examples of such alkoxysilanes include $Si(OCH_3)_4$ and $Si(OC_2H_5)_4$.

When M is Al, a is 3. Such an alkoxide is represented by $Al(OR^2)_3$, wherein $R^2$ is preferably a lower alkyl group. Examples of such aluminum alkoxides include $Al(OCH_3)_3$, $Al(OC_2H_5)_3$, $Al(O-n-C_3H_7)_3$, $Al(O-iso-C_3H_7)_3$ and $Al(OC_4H_9)_3$. The aluminum alkoxides may be used either singly or in any combination thereof. Such aluminum alkoxides are generally used in combination with the alkoxysilane. The use of the aluminum alkoxide enhances the light transmission properties and heat resistance of the resulting anti-fogging coating film. The amount of the aluminum alkoxide used is preferably within a range of from 1 to 10 parts by weight per 100 parts by weight of the alkoxysilane.

When M is Ti, a is 4. Such an alkoxide is represented by $Ti(OR^3)_4$, wherein $R^3$ is preferably a lower alkyl group.

Examples of such titanium alkoxides include $Ti(OCH_3)_4$, $Ti(OC_2H_5)_4$, $Ti(O-n-C_3H_7)_4$, $Ti(O-iso-C_3H_7)_4$ and $Ti(OC_4H_9)_4$. The titanium alkoxides may be used either singly or in any combination thereof. Such titanium alkoxides are generally used in combination with the alkoxysilane. The use of the titanium alkoxide enhances the ultraviolet light resistance of the resulting anti-fogging coating film, and markedly improves the heat resistance of a substrate. The amount of the titanium alkoxide used is preferably within a range of from 0.1 to 3 parts by weight per 100 parts by weight of the alkoxysilane.

When M is Zr, a is 4. Such an alkoxide is represented by $Zr(OR^4)_4$, wherein $R^4$ is preferably a lower alkyl group. Examples of such zirconium alkoxides include $Zr(OCH_3)_4$, $Zr(OC_2H_5)_4$, $Zr(O-iso-C_3H_7)_4$, $Zr(O-t-C_4H_9)_4$ and $Ti(O-n-C_4H_9)_4$. The zirconium alkoxides may be used either singly or in any combination thereof. Such zirconium alkoxides are generally used in combination with the alkoxysilane. The use of the zirconium alkoxide enhances the toughness and heat resistance of the resulting anti-fogging coating film. The amount of the zirconium alkoxide used is preferably within a range of from 0.5 to 5 parts by weight per 100 parts by weight of the alkoxysilane.

Examples of the alkoxides other than the above alkoxides include $Ca(OC_2H_5)_2$, $Fe(OC_2H_5)_3$, $V(O-iso-C_3H_7)4$, $Sn(O-t-C_4H_9)_4$, $Li(OC_2H_5)$, $Be(OC_2H_5)_2$, $B(OC_2H_5)3$, $P(OC_2H_5)_2$ and $P(OCH_3)_3$.

Among the alkoxides represented by the formula (I), the compounds in which n is a-1 or smaller, namely, the compounds in which group(s) X other than alkoxyl groups are bonded to M, include, for example, compounds in which X tother is halogen such as Cl or Br. The compounds in which X is halogen is hydrolyzed in the same way as in a alkoxyl group to form an OH group as described below, and so a polycondensation reaction takes place. X may be an alkyl group or an alkyl group having a functional group. The number of carbon atoms in this alkyl group is generally within a range of from 1 to 15. Such a group is not hydrolyzed, but remains as an organic moiety in the resulting polymer. Examples of the functional group include carboxyl, carbonyl, amino, vinyl and epoxy groups. Such a group is preferred in that anti-fogging properties are enhanced as described below.

Examples of the compounds of the formula (I) having X include vinyltrichlorosilane, vinyltrimethoxysilane, vinyltriethoxysilane, γ-methacryloxypropyltrimethoxysilane, γ-glycidoxypropyltrimethoxysilane, γ-aminopropyltrimethoxysilane.

Examples of the polyacrylic used in the present invention include polyacrylic acid, polymethacrylic acid, and methyl and ethyl esters thereof. The methyl and ethyl esters of polyacrylic acid and polymethacrylic acid are preferably saponified products each having a saponification degree of 10 to 30 mol % [namely, (the number of moles of the saponified ester group)×100/(the number of moles of the saponified ester group+the number of moles of the unsaponified ester group)]. The amount of the polyacrylic used is preferably within a range of from 1 to 5 parts by weight (solid content) per 100 parts by weight of the anti-fogging coating material.

The polyvinyl alcohol used in the present invention are incompletely saponified products having a saponification degree of preferably 65 to 85 mol % [namely, (the number of moles of the hydroxyl group)×100/(the number of moles of the acetyl group+the number of moles of the hydroxyl group)], more preferably 75 to 82 mol %. The amount of the polyvinyl alcohol used is preferably within a range of from 1 to 10 parts by weight (solid content) per 100 parts by weight of the anti-fogging coating material.

In the anti-fogging coating material according to the present invention, it is preferred that hydrosilicofluoric acid be further used. The amount of hydrosilicofluoric acid used is preferably within a range of from 0.005 to 0.5 parts by weight per 100 parts by weight of the anti-fogging coating material.

In the anti-fogging coating material according to the present invention, it is preferred that a silane coupling agent having an epoxy group be further used. The silane coupling agent is preferably γ-glycidoxypropyltrimethoxysilane. The amount of the coupling agent used is preferably within a range of from 0.05 to 10 parts by weight per 100 parts by weight of the anti-fogging coating material.

The present applicant proposed in Japanese Patent Application Ser. No. 9-206102 corresponding to U.S. patent application Ser. No. 09/119,404 that a benzophenone compound, which acts as both ultraviolet absorbent and group scavenger, is added for the purpose of enhancing the weather resistance of the resulting anti-fogging coating film. It has been confirmed that the addition of this benzophenone compound is also effective in the present invention. The benzophenone compound is represented by the general formula

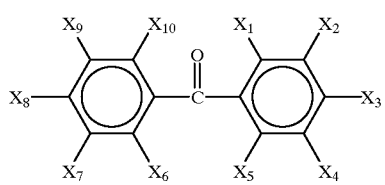

(II)

wherein $X_1$ to $X_{10}$, which may be the same or different from one another, are each a group selected from the group consisting of hydrogen, a hydroxyl group, a sulfonic acid group, a carboxyl group, an acyl group, an ester group, an ether group, hydrocarbon groups, alkoxyl groups having 1 to 6 carbon atoms, an amino group, hydroxyalkyl groups and hydroxyalkoxyl groups, with the proviso that at least one of $X_1$ to $X_{10}$ is a group selected from a hydroxyl group and a sulfonic acid group.

As a catalyst preferably used in the present invention, may be named an acid catalyst. The acid catalyst is used in the hydrolysis of the inorganic alkoxide. Accordingly, the inorganic alkoxide is hydrolyzed and polycondensed in some degree in advance to become a polymer (which may be an oligomer having a relatively low molecular weight) having OH groups.

As the acid catalyst, may be used a mineral acid such as hydrochloric acid, sulfuric acid or nitric acid. An anhydride of the mineral acid, for example, hydrogen chloride gas may be used. In addition, organic acids and anhydrides thereof may be used. They are exemplified by the following: tartaric acid, phthalic acid, maleic acid, dodecylsuccinic acid, hexahydrophthalic acid, methylnadic acid, pyromellitic acid, benzophenonetetracarboxylic acid, dichlorosuccinic acid, chlorendic acid, phthalic anhydride, dodecylsuccinic anhydride, hexahydrophthalic anhydride, methylnadic anhydride, pyromellitic anhydride, benzophenonetetracarboxylic anhydride, dichlorosuccinic anhydride and chlorendic anhydride. These acid catalysts are used in an amount of preferably from 0.01 to 0.5 parts by weight, more preferably from 0.015 to 0.3 parts by weight per 100 parts by weight of the alkoxide.

Further, the organic acid derived from the saponified moiety of the polyacrylic ester functions as a catalyst for hydrolysis and polycondensation reaction of the alkoxide, preferably the alkoxide and γ-glycidoxypropyltrimethoxysilane.

Examples of an organic solvent preferably used in the anti-fogging coating material according to the present invention include solvents having good compatibility with water, such as methyl alcohol, ethyl alcohol, isopropyl alcohol and butyl alcohol. It is more preferred that the organic solvent be used together with water. The amount of the organic solvent used is preferably within a range of from 100 to 5,000 parts by weight per 100 parts by weight of the anti-fogging coating material.

The anti-fogging coating films according to the present invention can be formed via the steps of applying to the surface of a substrate a reaction solution containing at least one of an inorganic alkoxide, a hydrolysate of the inorganic alkoxide and a low molecular weight polycondensate of the hydrolysate, a polyacrylic, polyvinyl alcohol and preferably a catalyst for accelerating the polycondensation reaction of the hydrolysate to form a coating film on the substrate surface and subjecting the coating film thus formed to heat-treatment. The term "containing at least one of an inorganic alkoxide, a hydrolysate of the inorganic alkoxide and a low molecular weight polycondensate of the hydrolysate" means any one of the following four cases.

(1) An inorganic alkoxide is used for the preparation of the reaction solution, and the hydrolyzing reaction thereof is effected after the preparation of the reaction solution.

(2) A hydrolysate obtained by subjecting an inorganic alkoxide to a hydrolyzing reaction in advance is used for the preparation of the reaction solution.

(3) A low molecular weight polycondensate obtained by partially polycondensing a hydrolysate of an inorganic alkoxide in advance is used for the preparation of the reaction solution.

(4) At least two of an inorganic alkoxide, a hydrolysate thereof and a low molecular weight polycondensate of the hydrolysate are used for the preparation of the reaction solution.

Since the anti-fogging coating films according to the present invention are obtained by a sol-gel reaction in the presence of the polyacrylic and polyvinyl alcohol, the principal compositions of the coating films are considered to comprise a polycondensate obtained by deprotonating the OH group(s) of the hydrolysate of the inorganic alkoxide and consequently initiating a polycondensation reaction; the above-described complex polymer obtained by a crosslinking reaction between the OH groups contained in the polycondensate, and the polyacrylic, polyvinyl alcohol and the like; a reaction product of the hydrolysate of the inorganic alkoxide with the polyacrylic, polyvinyl alcohol and the like; and a reaction product of three reactants of the polycondensate, the hydrolysate, and the polyacrylic, polyvinyl alcohol and the like.

The substrates used in the present invention include lenses, optical parallel plates, mirrors, prisms, glass and plastics.

The anti-fogging article according to the present invention is formed, for example, in the following manner. The individual components of the anti-fogging coating material are first mixed with each other to prepare a transparent coating fluid. This coating fluid is then applied to at least one side of a substrate and dried under heating at preferably 80° C. or higher, more preferably at a temperature ranging from 120° C. to 200° C., thereby obtaining the anti-fogging article according to the present invention. If need be, the coating fluid may be applied repeatedly several times, followed by the heat treatment.

The thickness of the coating film is preferably within a range of from 0.01 μm to 10 μm in the case where it is used for optical lenses. When the coating fluid is applied to window glass and the like, the thickness of the coating film is preferably within a range of from 1.0 μm to 10.0 μm. The thickness of the coating film may be suitably adjusted by applying the coating fluid thick or thin, or changing the number of times of the application. With the anti-fogging article thus obtained, imparts anti-fogging properties and dew condensation-preventing properties are imparted to the surface of the substrate. The anti-fogging coating film formed is insoluble in water and organic solvents and has a high surface hardness.

When the anti-fogging coating material according to the present invention is applied to a substrate, dried and then heat-treated, the condensation reaction and crosslinking reaction among the above-described reactions are allowed to proceed to form a complex polymer having a three-dimensional structure. This polymer is a polymer having an inorganic moiety and an organic moiety. Since the complex polymer has an insoluble skeleton of the inorganic moiety, an anti-fogging coating film formed by this polymer is insoluble in water and organic solvents and has a high surface hardness. This polymer further has hydrophilic groups derived from the polyacrylic ester and polyvinyl alcohol of the organic moiety, and such hydrophilic portions exist on the surface of the coating film formed. Therefore, moisture or water is adsorbed on such a portion.

The present invention will be described below more specifically by the following examples.

EXAMPLE 1

A coating fluid was prepared in accordance with the formulation shown in Table 1 by adding a 10% (by weight; the same shall apply hereinafter) aqueous solution of polyvinyl alcohol (average polymerization degree: 2,000, saponification degree: about 82 mol %) to a 2.5% water-methanol solution of a 20 mol %-saponified product of polymethyl acrylate [a saponified product obtained by adding methanol to a 25% aqueous solution of polyacrylic acid (average molecular weight: 150,000), stirring the resulting mixture at ordinary temperature (25° C.) for 30 minutes to produce polymethyl acrylate, adding sodium hydroxide (caustic soda) to the polymethyl acrylate thus obtained so as to give a saponification degree of 20% and then stirring the resulting mixture for additional 30 minutes to saponify the methyl ester], stirring the resulting mixture at ordinary temperature (25° C.) for 10 minutes, adding to the mixture a solution of γ-glycidoxypropyl-trimethoxysilane, a solution of a hydrolysate of aluminum isopropoxide (a solution obtained by hydrolyzing aluminum isopropoxide using an acid catalyst in ethanol; 5% by weight in terms of $Al_2O_3$) and a 0.47% methanol solution of hydrosilicofluoric acid prepared in advance, and then stirring the resulting mixture at ordinary temperature (25° C.) for 15 minutes.

The coating fluid thus obtained was colorless and transparent. A glass sheet was dip coated with the coating fluid at a lifting rate of 50 mm/min by using a dip coating device. The coated glass sheet was heated and dried at 150° C. for 10 minutes, thereby obtaining a colorless, transparent coating film having a uniform thickness (thickness of the coating film: 3.0 μm). The coated glass sheet was placed in a refrigerator (about 0° C.) for 5 minutes and then left standing in an atmosphere of 25° C. and 81% RH. As a result, no occurrence of fogging was observed on the coated surface of the glass sheet.

TABLE 1

|  | (parts by weight) |
|---|---|
| 20 mol %-Saponified product of polymethyl acrylate (solution in water-methanol) | 59.50 |
| 10% Aqueous solution of polyvinyl alcohol (saponification degree: about 82 mol %) | 37.50 |
| γ-Glycidoxypropyltrimethoxysilane | 0.14 |
| Ethanol solution of aluminum isopropoxide (containing 5% by weight of $Al_2O_3$) | 0.28 |
| 0.47% Methanol solution of hydrosilicofluoric acid | 2.58 |
| Total | 100.00 |

The surface of the coated glass sheet was wiped repeatedly 50 times with lens cleaning paper (Dusper, trade name; product of OZU CO., LTD., Tokyo) impregnated with water under a load of 300 g. As a result, no peeling of the coating film occurred, and its surface was not damaged by the wiping.

COMPARATIVE EXAMPLE 1

A test was made in the same manner as in Example 1 except that no coating film was applied to the glass sheet. As a result, fogging immediately occurred on the surface of the glass sheet, and was not removed until 5 minutes later.

COMPARATIVE EXAMPLE 2

A coating fluid prepared in the same manner as in Example 1 except that the 10% aqueous solution of polyvinyl alcohol was not added, was used to prepare a coated glass sheet in the same manner as in Example 1. The surface of the coated glass sheet was tested for separation of coating film in the same manner as in Example 1. As a result, separation of the coating film occurred at the time the surface had been wiped repeatedly 5 times.

EXAMPLE 2

A coated glass sheet was prepared in the same manner as in Example 1 except that hydrosilicofluoric acid used in Example 1 was not added. The anti-fogging effect of this glass sheet was the same as in Example 1. When the surface of the coated glass sheet was wiped repeatedly with lens cleaning paper in the same manner as in Example 1, no peeling of the coating film occurred even after the surface was wiped repeatedly about 25 times. However, it was observed that the surface was somewhat damaged by the wiping.

EXAMPLE 3

A coating fluid was prepared in accordance with the formulation shown in Table 2 by adding methanol and a 10% aqueous solution of polyvinyl alcohol (average polymerization degree: 2,000; saponification degree: about 82 mol %) to a 25% aqueous solution of polyacrylic acid (average molecular weight: 150,000), stirring the resulting mixture at ordinary temperature (25° C.) for 10 minutes, adding to the mixture a solution of γ-glycidoxypropyltrimethoxysilane, a solution of a hydrolysate of aluminum isopropoxide (a solution obtained by hydrolyzing aluminum isopropoxide using an acid catalyst in ethanol; 5% by weight in terms of $Al_2O_3$) and a 0.47% methanol solution of hydrosilicofluoric acid prepared in advance, and then stirring the resulting mixture at ordinary temperature (25° C.) for 15 minutes.

The coating fluid thus obtained was colorless and transparent. This coating fluid was applied to a glass sheet and dried in the same manner as in Example 1, thereby obtaining a colorless, transparent coating film having a uniform thickness (thickness of the coating film: 3.0 μm).

The coated glass sheet thus obtained was tested in the same manner as in Example 1. As a result, neither fog nor frost occurred on the coated surface of the glass sheet.

TABLE 2

|  | (parts by weight) |
|---|---|
| 25% Aqueous solution of polyacrylic acid | 6.00 |
| Methanol | 53.50 |
| 10% Aqueous solution of polyvinyl alcohol (saponification degree: about 82 mol %) | 37.50 |
| γ-Glycidoxypropyltrimethoxysilane | 0.14 |
| Ethanol solution of aluminum isopropoxide (containing 5% by weight of Al₂O₃) | 0.28 |
| 0.47% Methanol solution of hydrosilicofluoric acid | 2.58 |
| Total | 100.00 |

EXAMPLE 4

A 10% methanol solution of 2,2',4,4'-tetrahydroxybenzophenone as an ultraviolet light absorber and a 10% methanol solution of bis-[N-formyl-(2,2,6,6-tetramethyl-4-piperidyl)imino]hexamethylene as a supplementary ultraviolet light absorber, both prepared in advance were added to a coating fluid prepared in the same manner as in Example 1 in accordance with the formulation shown in Table 3. The mixture was stirred at ordinary temperature (25° C.) for 15 minutes. The coating fluid thus obtained had a yellow color. This coating fluid was applied to a glass sheet and dried in the same manner as in Example 1. The coating film (thickness of the coating film: 3.0 μm) thus obtained was colorless and transparent. The coated glass sheet thus obtained was tested in the same manner as in Example 1. As a result, neither fog nor frost occurred on the coated surface of the glass sheet.

The coated glass sheet was exposed for 200 hours to ultraviolet light (250 nm, 4 kW) from a distance of about 24 cm. Then, the coated glass sheet was subjected to the same test on anti-fogging properties as described above. As a result, neither fog nor frost occurred on the coated surface of the glass sheet, and besides, the surface did not undergo changes such as cracking and separation.

TABLE 3

|  | (parts by weight) |
|---|---|
| 20 mol %-Saponified product of polymethylacrylate (solution in water-methanol) | 58.58 |
| 10% Aqueous solution of polyvinyl alcohol (saponification degree: about 82 mol %) | 36.92 |
| γ-Glycidoxypropyltrimethoxysilane | 0.14 |
| Ethanol solution of aluminum isopropoxide (containing 5% by weight of Al₂O₃) | 0.27 |
| 0.47% Methanol solution of hydrosilicofluoric acid | 2.54 |
| 10% Methanol solution of ultraviolet light absorber | 1.03 |
| 10% Methanol solution of supplementary ultraviolet light absorber | 0.52 |
| Total | 100.00 |

EXAMPLE 5

A coating fluid was prepared in accordance with a formulation shown in Table 4, and a coated glass sheet was prepared in the same manner as in Example 1.

The anti-fogging effect of this glass sheet was the same as in Example 1. When the surface of the coated glass sheet was wiped repeatedly with lens cleaning paper in the same manner as in Example 1, no peeling of the coating film occurred even after the surface was wiped repeatedly 30 times. Partial peeling of the coating film was observed at the time the surface had been wiped repeatedly about 40 times.

TABLE 4

|  | (parts by weight) |
|---|---|
| 20 mol %-Saponified product of polymethyl acrylate (solution in water-methanol) | 59.58 |
| 10% Aqueous solution of polyvinyl alcohol (saponification degree: about 82 mol %) | 37.55 |
| Ethanol solution of aluminum isopropoxide (containing 5% by weight of Al₂O₃) | 0.28 |
| 0.47% Methanol solution of hydrosilicofluoric acid | 2.59 |
| Total | 100.00 |

While the present Invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An anti-fogging coating material comprising a solution which comprises:
   i) at least one composition selected from the group consisting of an inorganic alkoxide, a hydrolysate of the inorganic alkoxide and a polycondensate of the hydrolysate of the inorganic alkoxide;
   ii) a polyacrylic; and
   iii) polyvinyl alcohol.

2. The anti-fogging coating material according to claim 1, wherein the inorganic alkoxide is at least one of compounds represented by the formulae $$M(OR)_n(X)_{a-n} \tag{I}$$

wherein M is an element selected from the group consisting of Si, Al, Ti, Zr, Ca, Fe, V, Sn, Li, Be, B and P, R is an alkyl group, X is an alkyl group, an alkyl group having a functional group or halogen, a is a valence of M, and n is an integer of from 1 to a.

3. The anti-fogging coating material according to claim 1, wherein the inorganic alkoxide is at least one selected from the group consisting of $Si(OC_2H_5)_4$, $Al(O\text{-iso-}C_3H_7)_3$, $Ti(O\text{-iso-}C_3H_7)_4$, $Zr(O\text{-t-}C_4H_9)_4$, $Zr(O\text{-n-}C_4H_9)_4$, $Ca(OC_2H_5)_2$, $Fe(OC_2H_5)_3$, $V(O\text{-iso-}C_3H_7)_3$, $Sn(O\text{-t-}C_4H_9)_4$, $Li(OC_2H_5)$, $Be(OC_2H_5)_2$, $B(OC_2H_5)_3$, $P(OC_2H_5)_2$ and $P(OCH_3)_3$.

4. The anti-fogging coating material according to claim 1, wherein hydrosilicofluoric acid is further used as a formulation ingredient.

5. The anti-fogging coating material according to claim 1, wherein a silane coupling agent having an epoxy group is further used as a formulation ingredient.

6. The anti-fogging coating material according to claim 5, wherein the epoxy group is a glycidoxy group.

7. The anti-fogging coating material according to claim 1, wherein hydrosilicofluoric acid and a silane coupling agent having an epoxy group are further used as formulation ingredients.

8. The anti-fogging coating material according to claim 1, wherein the polyacrylic is at least one selected from the group consisting of polyacrylic acid, polymethacrylic acid, polyacrylic esters and polymethacrylic esters.

9. The anti-fogging coating material according to claim 1, wherein a saponification degree of polyvinyl alcohol is 65 to 85 mol %.

10. The anti-fogging coating material according to claim 1, wherein a benzophenone compound represented by the following formula is further used as a formulation ingredient:

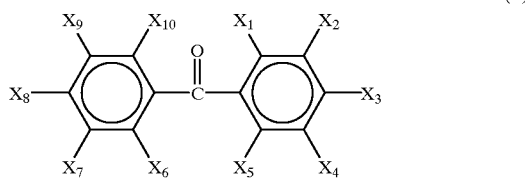

(II)

wherein $X_1$ to $X_{10}$, which may be the same or different from one another, are each a group selected from the group consisting of hydrogen, a hydroxyl group, a sulfonic acid group, a carboxyl group, an acyl group, an ester group, an ether group, hydrocarbon groups, alkoxyl groups having 1 to 6 carbon atoms, an amino group, hydroxyalkyl groups and hydroxyalkoxyl groups, with the proviso that at least one of $X_1$ to $X_{10}$ is a group selected from the group consisting of a hydroxyl group and a sulfonic acid group.

11. An anti-fogging coating film formed by using, as a main component, a composition obtained by a polycondensation reaction of a hydrolysate of an inorganic alkoxide in the presence of a polyacrylic and polyvinyl alcohol.

12. An anti-fogging coating film formed by using, as a main component, a composition obtained by a polycondensation reaction of a hydrolysate of an inorganic alkoxide in the presence of a polyacrylic, polyvinyl alcohol and hydrosilicofluoric acid.

13. An anti-fogging coating film formed by using, as a main component, a composition obtained by a polycondensation reaction of a hydrolysate of an inorganic alkoxide in the presence of a polyacrylic, polyvinyl alcohol, hydrosilicofluoric acid and a silane coupling agent having an epoxy group.

14. An anti-fogging coating film formed by using, as a main component, a composition obtained by a polycondensation reaction of a hydrolysate of an inorganic alkoxide in the presence of a polyacrylic, polyvinyl alcohol and a benzophenone compound represented by the formula

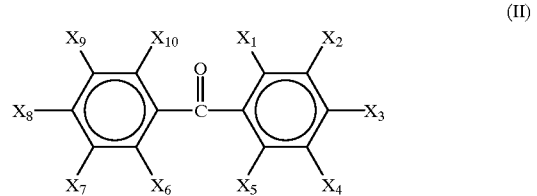

(II)

wherein $X_1$ to $X_{10}$, which may be the same or different from one another, are each a group selected from the group consisting of hydrogen, a hydroxyl group, a sulfonic acid group, a carboxyl group, an acyl group, an ester group, an ether group, hydrocarbon groups, alkoxyl groups having 1 to 6 carbon atoms, an amino group, hydroxyalkyl groups and hydroxyalkoxyl groups, with the proviso that at least one of $X_1$ to $X_{10}$ is a group selected from the group consisting of a hydroxyl group and a sulfonic acid group.

* * * * *